July 15, 1969        A. HAUPT        3,455,323
GAS REGULATOR WITH ELECTRONIC PRESSURE CONTROL
Filed April 8, 1966        2 Sheets-Sheet 1
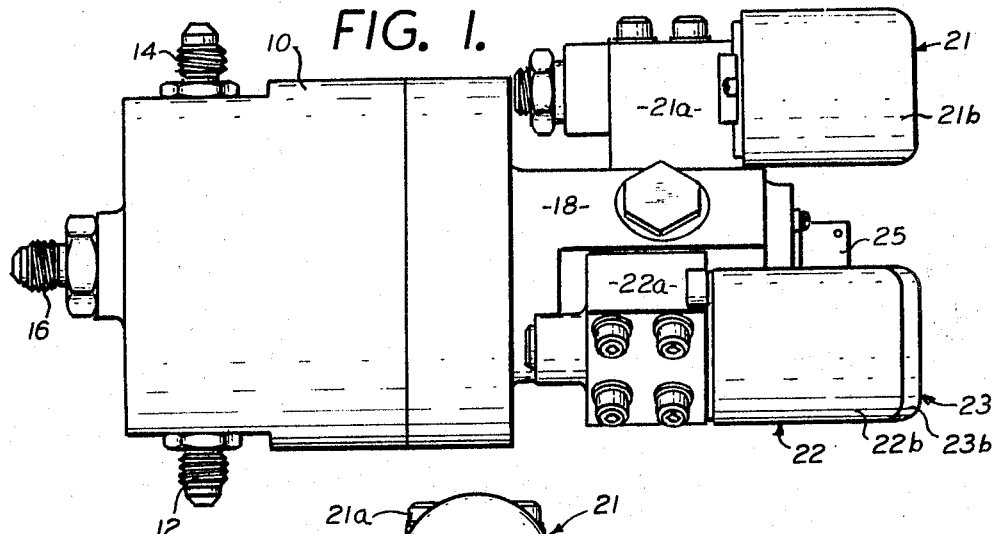
FIG. 1.
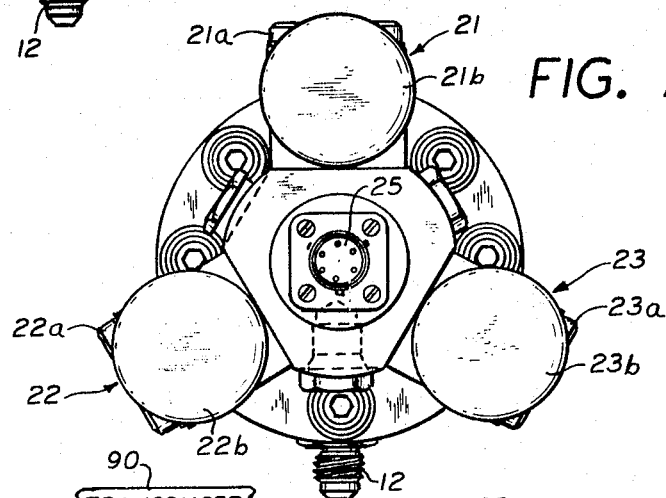
FIG. 2.
FIG. 3.
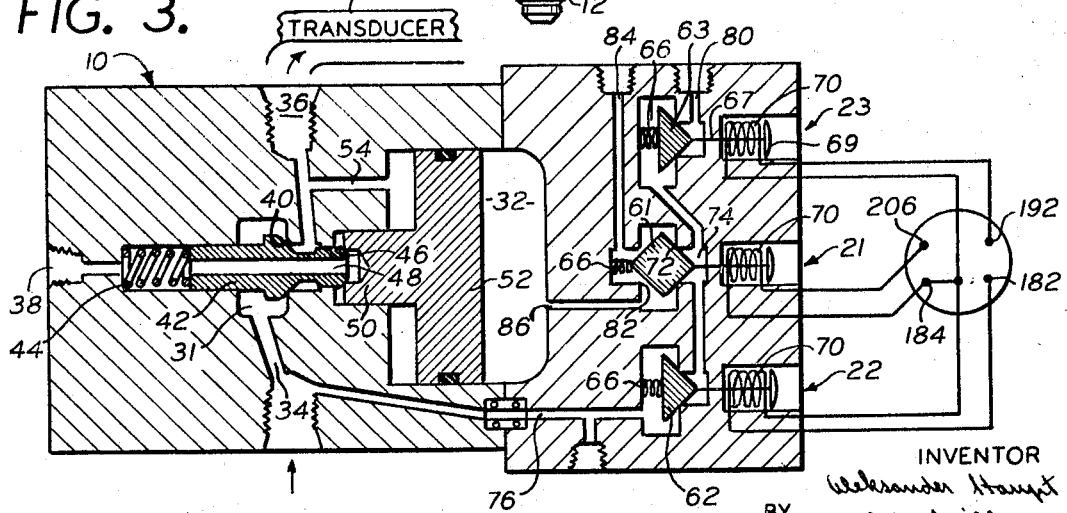
INVENTOR
Alexander Haupt
BY
ATTORNEYS.

United States Patent Office 3,455,323
Patented July 15, 1969

3,455,323
GAS REGULATOR WITH ELECTRONIC PRESSURE CONTROL
Aleksander Haupt, Rockaway, N.J., assignor to Marotta Valve Corporation, Boonton, N.J., a corporation of New Jersey
Filed Apr. 8, 1966, Ser. No. 541,207
Int. Cl. G05d *11/00;* F16k *31/02*
U.S. Cl. 137—116.5       5 Claims

ABSTRACT OF THE DISCLOSURE

A pressure regulator operated by using electric power responsive to a transducer. The latter is exposed to the pressure that is to be controlled.

---

This invention relates to regulators and more especially to a regulator which has its operation controlled electrically.

It is an object of the invention to control the operation of a pressure regulator by electric power that is responsive to a transducer exposed to the pressure that is to be controlled. In the preferred embodiment, the transducer output voltage, and a reference output from a standardization network, are equal, within accepted tolerances, when the pressure regulator is in equilibrium. Any difference between the transducer output voltage and the reference voltage is sensed by a voltage comparator and this error voltage is fed to the input of an operational amplifier initially working under open loop conditions. The clipped output voltage of the amplifier serves to operate one of two silicon-controlled switches that, in turn, trigger silicon-controlled rectifiers operating as the need arises to actuate either loading or venting valves, and this brings the relevant valve to a necessary correction to again put the system in equilibrium.

Another object is to provide an improved pressure regulator with a dome having a movable wall (diaphragm or piston) for operating the valve that controls the regulator output pressure, and to provide automatic electrically actuated valves for loading or unloading the pressure chamber of the dome. This pressure chamber of the dome is supplied with working fluid, conveniently from the input side of the pressure regulator and the regulator may be considered an "electropneumatic regulator."

Still another object is to provide an improved control for a pressure regulator in which the effect of delivery pressure on a transducer is compared with a reference voltage and the pressure regulator is adjusted automatically according to whether the comparison shows a positive or a negative difference.

Other objects, features and advantages of the invention will appear or be pointed out as the description proceeds.

In the drawing, forming a part hereof, in which like reference characters indicate corresponding parts in all the views:

FIGURE 1 is a side elevation of a regulator made in accordance with this invention;

FIGURE 2 is an end view of the regulator shown in FIGURE 1;

FIGURE 3 is a diagrammatic sectional view of the regulator shown in FIGURES 1 and 2.

Figure 4:
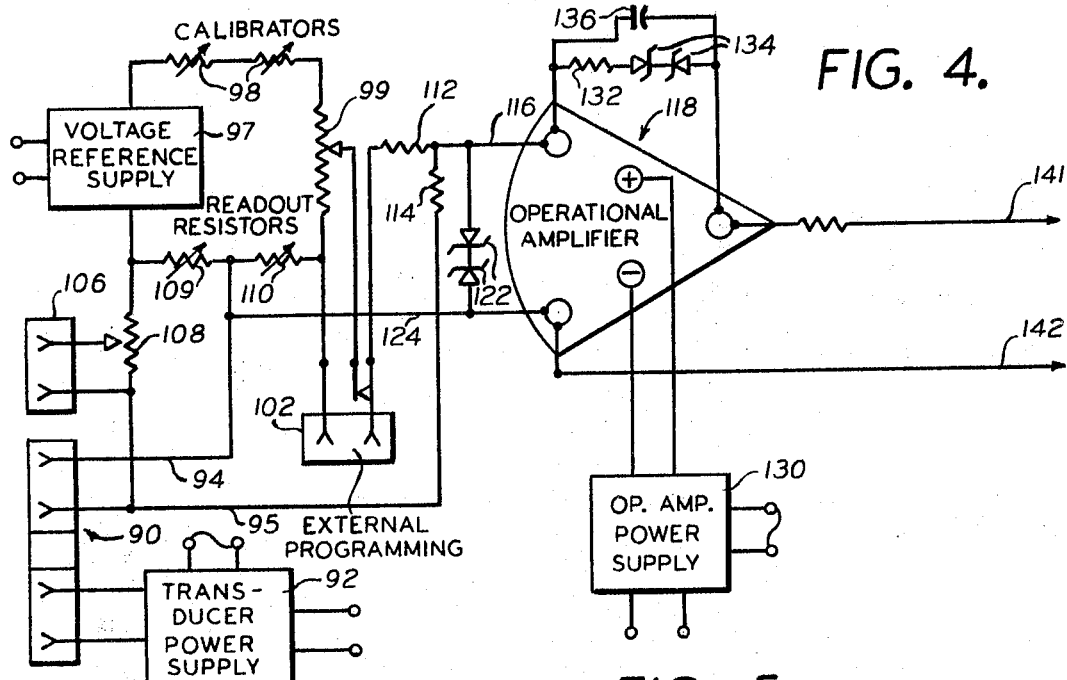
FIGURES 4 and 5 are schematic wiring diagrams for the regulator shown in the other figures.

The pressure regulator includes a main housing 10 having an inlet fitting 12 and an outlet fitting 14. At one end of the housing 10 there is a fitting 16 which connects with a vent passage of the regulator. The housing 10 includes an extension 18 to which valves and actuators are connected. There is one valve and actuator assembly 21 connected with the top of the extension 18 and there are other valve and actuator assemblies 22 and 23 (FIGURE 2) connected with the lower part of the extension 18.

The valve and actuator assembly 21 includes a housing 21a for a valve and a shell 21b which incloses an electromagnetic actuator comprising a magnetic coil and armature and shaft which will be explained in connection with FIGURE 3. The other valve and actuator assemblies 22 and 23 include corresponding valve housings 22a and 23a respectively and corresponding shells 22b and 23b, respectively, including magnetic coils, armatures and shafts, as will be explained. At the end of the extension 18 there is a socket 25 for receiving the prongs of a connector which supplies electric energy for operating the different coils of the electromagnetic actuators.

FIGURE 3 shows the working parts of the regulator 10 and the valve and actuator assemblies 21, 22 and 23 diagrammatically.

The housing 10 includes a valve chamber 31 and a pressure chamber 32. The valve chamber has an inlet passage 34 and an outlet passage 36. It also has a vent passage 38. It is these passages 34, 36 and 38 which hold the fittings 12, 14 and 16, respectively, shown in FIGURE 1.

There is a valve seat 40 located in the valve chamber 31 between the passage 34 and the passage 36. A valve element 42 is normally held in closed position by a spring 44; and when in closed position, this valve element 42 prevents fluid in the passage 34 from flowing through the valve chamber 31 to the passage 36.

The left-hand end of the valve element 42 is of substantially the same cross section as the portion of the seat 40 with which the valve element contacts, and this makes the valve element 42 a counter balanced valve as to the high pressure in the passage 34. The other end of the valve element 42 has a head portion 46 which is only slightly smaller in cross section than the open area through the seat 40 so that the valve element 42 is substantially balanced as to the outlet pressure in the passage 36.

There is an axial opening 48 through the valve element 42. This axial opening 48 is closed at the right-hand end by the contact of the end face of the head 46 with a seat on the stem 50 of a piston 52 which moves axially in the chamber 32 and which constitutes a movable wall of that chamber. As long as the stem 50 is in contact with the head 46, no fluid can escape from the valve chamber past the end of the valve element 42 and into the axial passage 48; but if the piston 52 continues to move toward the right in FIGURE 3, after the valve element 42 has come in contact with the seat 40, then a gap opens between the head portion 46 and the stem 50 so that fluid can flow into the passage 48 and from this passage out through the vent passage 38.

The space on the side of the piston 52 opposite the pressure chamber 32 is connected with the outlet passage 36 by a communicating passage 54 and this passage 54 maintains a back pressure on the piston 52 which is always equal to the outlet pressure of the regulator in the passage 36. Although the stem 50 of the piston 52 operates in a guide bore, there is no seal between the stem 50 and the guide bore, and fluid in the space on the left-hand side of the piston 52 can flow through the running clearance between the stem 50 and the guide bore to reach the head portion 46 and the seat and axial passage 48 when the head portion 46 is not in contact with the complementary seat on the stem 50.

The valve and actuator assemblies 21, 22 and 23 include valve elements 61, 62 and 63, respectively, Each of these elements is normally held in closed position against a seat, located on the right of the valve element in FIGURE 3, by a spring 66; and each of the valve elements has a stem 67 with an armature 69 connected to the end of the stem remote from the valve. The stem 67 passes through a coil 70 and when this coil 70 is energized, it attracts the armature 69 and moves it towards the left to open the valve against the pressure of the spring 66. When the electromagnetic coil 70 is de-energized, the spring 66 restores the valve element to its original closed position.

When the valve element 61 is moved into a closed position in contact with a seat 72 by its spring 66, it prevents flow of fluid from or to a passage 74 which communicates on one side with a working fluid supply passage 76 leading to the upstream passage 34 of the regulator; and which communicates on the other side with a vent passage 80 through which gas can escape to the atmosphere. The passage 76 is commanded by the valve element 62 and the passage 80 is commanded by the valve element 63.

When the valve element 61 is moved by the solenoid 70 into a closed position in contact with a seat 82, it closes communication with an emergency vent passage 84. There is an intermediate passage 86 leading from the pressure chamber 32 to a mid-portion of the chamber in which the valve element 61 is located. With the valve element 61 closed against the seat 72, therefore, the passage 86 and the pressure chamber 32 are in direct communication with the emergency vent passage 84. With the valve element 61 closed against the seat 82, the passage 86 and the pressure chamber 32 are in communication with the passage 74 and not in communication with either the passage 76 or the passage 80 unless one or the other of the valve elements 62 or 63 are in open position. If the valve element 62 is in open position, then fluid from the inlet passage 34 flows through the passage 76, past the valve element 62, through the passage 74, past the valve element 61, and through the passage 86 to the pressure chamber 32. If the outlet pressure of the regulator in the passage 36 and the communicating passage 54, which exerts back pressure on the piston 52, is lower than the pressure supplied to the chamber 32, then the piston 52 moves to the left in FIGURE 3 and moves the valve element 42 into open position to supply additional fluid to the outlet passage 36 so that the pressure on the downstream side of the regulator will be increased. The strength of the spring 44 determines the amount of pressure difference between the upstream and downstream pressures necessary to make the regulator operate to move the valve element 42 into open position.

When the valve element 62 is in closed position and the valve element 63 is in open position, and the valve element 61 is against the left-hand seat 82, then pressure in the chamber 32 is reduced by flow of working fluid through the passage 86, past the valve element 61, through the passage 74, past the valve element 63, and out through the passage 80. This reduces the pressure in the chamber 32 and causes the piston 52 to move toward the right as the result of pressure supplied behind the piston from the passage 36 and connecting passage 54. This causes the valve element 42 to move into closed position.

It should be noted here that the piston 52 is not intended as the sensing element of the regulator. The piston is used as a motor means for moving the valve element 42 between its open and closed positions, but the determination of when the valve elements should move is determined by a transducer 90 located in position to be exposed to the pressure in the outlet passage 36.

Figure 5:
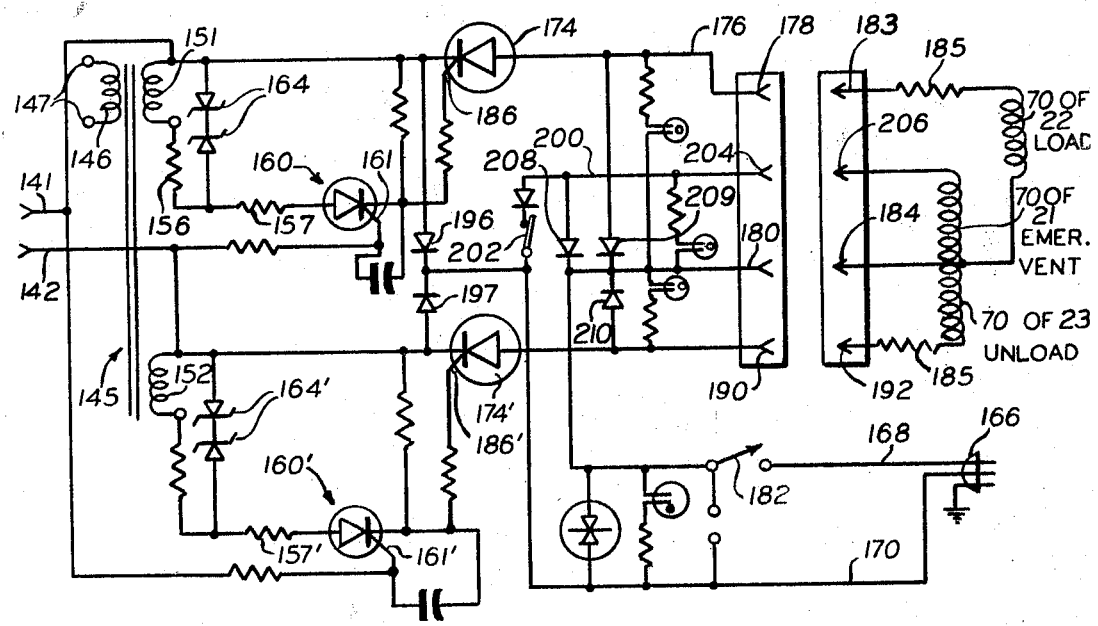

FIGURES 4 and 5 show an electric circuit by which pressure variations at the transducer 90 cause selective operation of the valve elements for increasing or decreasing the pressure in the chamber 32 to move the valve element 42 between open and closed positions. FIGURE 4 shows the transducer 90 connected with a power supply 92 and having output conductors 94 and 95. A refrerence voltage supply device 97 is connected with calibrating resistors 98 and a potentiometer 99. This potentiometer 99 is adjusted to obtain a reference voltage which corresponds, through the voltage output of the transducer, with the desired regulated pressure.

For connecting an external programming apparatus to the control circuit, there is a receptacle 102, and voltage supplied from the external programming apparatus can be used to operate the regulator in some other way than from the built-in reference voltage supply. For example, it may sometimes be desirable that the outlet pressure of the regulator vary from time to time, in accordance with a predetermined sequence.

A readout device 106 includes a potentiometer 108 and adjustable resistors 109 and 110 for calibrating purposes.

The voltage comparator includes a resistor 112 in series with a resistor 114 and both of which are connected across the transducer and reference voltage circuits, as shown. From a point between these resistors 112 and 114, there is a conductor 116 leading to one side of an operational amplifier 118. Two diodes 122 are connected across the input side of the amplifier 118. A conductor 124 connects the other input terminal of the amplifier 118 with the other side of the voltage comparator circuit.

Power is supplied to the amplifier 118 from a power supply device 130. There are two Zener diodes 134 connected across the amplifier, and in the wiring diagram illustrated, there is a capacitor 136 in parallel with the diodes 134, and a resistor 132 in series with the diodes to obtain the desired characteristics of the feed back. The amplifier has output leads 141 and 142 which connect with the portion of the wiring diagram shown in FIGURE 5.

This wiring diagram of FIGURE 5 shows a transformer 145 having a primary winding 146 connected with a power supply by leads 147. Transformer 145 has two secondary windings 151 and 152. Although there are interconnections between the circuits, the winding 151 is in a circuit for controlling the energizing of the coil 70 of the valve and actuator assembly 22; and the winding 152 is in a circuit for controlling the energizing of the coil 70 of the valve and actuator assembly 23. The first of these coils increases the pressure load on the piston and the second coil decreases the load on the piston, as indicated by the legends in FIGURE 5.

The secondary winding 151 is connected through resistances 156 and 157 with a silicone-controlled switch 160. The gate 161 of the switch 160 is connected with the conductor 142 from the amplifier 118. There are Zener diodes 164 connected across the winding 151 and resistor 156.

There is a plug 166 which connects with a power line and which has conductors 168 and 170 on opposite sides of the power line. The conductor 170 leads to a silicone-controlled rectifier 174 and beyond this rectifier there is a conductor 176 leading to a terminal 178. The other side of the circuit has the conductor 168 connected with a terminal 180 and includes a switch 182. The coil 70 of the valve and actuator assembly 22 is connected with the terminals 183 and 184 which join the terminals 178 and 180, respectively, when the wiring diagram circuits are connected with the coils of the pressure regulator.

The circuits of the coils 70 for the valve assemblies 22 and 23 are temperature-compensated so as to reduce the current variations, and the resulting power variation of the coils 70, with change in temperature of the coils. This compensation is obtained by having resistors 185 in series with the coils. Each of the resistors 185 is made of wire which, while not suitable for solenoid coils, has a low temperature coefficient of resistance so that there is less percentage change in the total resistance of the circuits of the coils 70 of valve assemblies 22 and 23 than if the coils 70 were the only resistances.

The signals from the amplifier 118 transmitted over the conductors 141 and 142, trigger the operation of the silicone-controlled switch 160 and this switch is connected with the gate 186 of the silicone-controlled rectifier 174. When the voltage becomes sufficiently positive, the rectifier 174 fires and current continues to flow until it drops below the holding value of the rectifier. Thus, the rectifier 174 acts as a switch for suppling power from the plug 166 to the coil 70 of the valve and actuator assembly 22.

There is a circuit connected with the secondary winding 152 similar to that connected with the winding 151 and and the parts are indicated by the same reference characters as the circuit for the winding 151 but with a prime appended. This circuit controls the operation of a silicone-controlled rectifier 174', and this rectifier 174' controls the flow of current from the conductor 168 through switch 182 to terminal 180, complementary terminal 184, coil 70, resistor 185, terminals 192 and 190, silicone-controlled rectifier 174', diode 197 and conductor 170.

Blocking diodes 196 and 197 permit the circuits to operate selectively with opposite polarities without interfering with one another, thus eliminating repetition of much wiring which would otherwise be necessary.

A circuit from the conductor 170 to a conductor 200 is established whenever a switch 202 is closed and this circuit is independent of the silicone controlled rectifiers 174 and 174'. The conductor 200 leads to a terminal 204 which engages a complementary terminal 206 on one side of the coil 70 of the valve and actuator assembly 21 which controls the emergency vent. Thus the emergency vent valve element 61 (FIGURE 3) is closed to the left whenever the circuit of FIGURE 5 is in use with the switch 202 closed. The emergency valve element is shifted to the right in FIGURE 3 to vent the chamber 32 by opening the switch 202; and it is automatically so shifted by a failure in the power supply to the plug 166 (FIGURE 5).

Diodes 208, 209 and 210 are connected in parallel with coils 70 of the actuator assemblies 21, 22 and 23, respectively, to provide "current doubler" circuits for these coils 70 in order to improve the coil pull-in characteristics and to reduce switching transients.

What is claimed is:

1. In a fluid pressure regulator of the type having a valve for controlling flow of fluid from an inlet to an outlet passage of the regulator, and motor means operated by fluid pressure for moving the pressure regulator valve between open and closed positions, the combination with said motor means of a working fluid supply system including a first valve for increasing the pressure of working fluid in the motor means, a working fluid exhaust system for decreasing the pressure of working fluid in the motor means, an electro-magnetic actuator in each of the working fluid systems, a pressure sensor exposed to the outlet pressure of the regulator, the pressure sensor being a transducer, and electric control circuits for the actuators connected with and responsive to the transducer of the pressure sensor, said electric control circuits comprising a means for supplying a reference voltage, a voltage comparator connected on one side with the transducer and on the other side with the reference voltage, an amplifier to which the output of the voltage comparator is supplied, two silicone-controlled switches, a silicone-controlled rectifier connected with each of said switches and triggered by the silicone-controlled switch to selectively supply power to one or the other of the electro-magnetic actuators to operate the regulator valve in a direction to restore equilibrium at the voltage comparator.

2. The combination described in claim 1 characterized by means for clipping the output of the amplifier.

3. The combination described in claim 1 characterized by a third valve, an emergency vent outlet for the discharge of working fluid from the motor means, the vent outlet being commanded by the third valve, and means for moving the third valve into position to open the emergency vent outlet independently of the operation of the other valves.

4. The combination described in claim 1, characterized by each of the electromagnetic actuators including an electromagnet, and temperature-compensating means in the circuit of each of the electromagnets for limiting the variation in the power of the magnet with variations in the temperature of said electromagnet.

5. In a fluid pressure regulator of the type having a valve for controlling flow of fluid from an inlet to an outlet passage of the regulator, and motor means operated by fluid pressure for moving the pressure regulator valve between open and closed positions, the combination with said motor means of a working fluid supply system including a first valve for increasing the pressure of working fluid in the motor means, a working fluid exhaust system for decreasing the pressure of working fluid in the motor means, an electro-magnetic actuator in each of the working fluid systems, a pressure sensor exposed to the outlet pressure of the regulator, the pressure sensor being a transducer, and electric control circuits for the actuators connected with and responsive to the transducer of the pressure sensor, a third valve, an emergency vent outlet for the discharge of working fluid from the motor means, the vent outlet being commanded by the third valve, and means for moving the third valve into position to open the emergency vent outlet independently of the operation of the other valves, a chamber in which the third valve is located, a vent passage at one end of said chamber communicating with the pressure vent outlet, a second passage at the other end of said chamber and communicating with the passages commanded by both of the other valves, and a third passage at an intermediate location in said chamber and communicating with the interior of the motor means for the flow of working fluid to and from said motor means, the third valve being a three-way, two-position valve operable between one position that puts the emergency vent outlet in communication with the third passage of the chamber while closing the second passage and another position that puts the third passage in communication with the second passage while closing the first passage.

References Cited

UNITED STATES PATENTS

| 2,971,537 | 2/1961 | Kowalski | 137—116.5 |
| 2,988,673 | 6/1961 | Harkins | 317—131 |
| 2,994,334 | 8/1961 | Loveless | 137—116.5 |
| 3,234,960 | 2/1966 | Bromm | 137—510 |
| 3,295,421 | 1/1967 | McCormick | 317—148.5 |

CLARENCE R. GORDON, Primary Examiner

HOWARD R. GORDON, Assistant Examiner

U.S. Cl. X.R.

137—510